(12) United States Patent
Nishida et al.

(10) Patent No.: US 7,122,848 B2
(45) Date of Patent: Oct. 17, 2006

(54) SUBSTRATE BONDED TRANSITION METAL CATALYST AND METHOD FOR PREPARATION THEREOF

(75) Inventors: Atsushi Nishida, Chiba (JP); Mitsuhiro Arisawa, Osaka (JP); Shiro Tsukamoto, Ibaraki (JP); Masahiko Shimoda, Ibaraki (JP)

(73) Assignees: Japan Science and Technology Agency, Saitama (JP); National Institute for Materials Science, Ibaraki (JP)

( * ) Notice: Subject to any disclaimer, the term of this patent is extended or adjusted under 35 U.S.C. 154(b) by 0 days.

(21) Appl. No.: 11/105,293

(22) Filed: Apr. 11, 2005

(65) Prior Publication Data

US 2005/0182214 A1 Aug. 18, 2005

Related U.S. Application Data

(63) Continuation of application No. PCT/JP03/13031, filed on Oct. 10, 2003.

(30) Foreign Application Priority Data

Oct. 11, 2002 (JP) ............... 2000-299141

(51) Int. Cl.
- H01L 31/072 (2006.01)
- H01L 31/109 (2006.01)
- H01L 31/0328 (2006.01)
- H01L 31/0336 (2006.01)

(52) U.S. Cl. ......................... 257/184; 438/99
(58) Field of Classification Search ............ 257/184; 438/99, 118, 119

See application file for complete search history.

(56) References Cited

U.S. PATENT DOCUMENTS

| | | | |
|---|---|---|---|
| 3,681,511 A | * | 8/1972 | Miller .................. 174/36 |
| 4,812,333 A | * | 3/1989 | Micheli ................ 427/226 |
| 5,073,483 A | * | 12/1991 | Lebacq ................. 435/6 |
| 5,352,519 A | * | 10/1994 | Stevens et al. ........ 428/389 |
| 5,620,531 A | | 4/1997 | Ikai et al. |
| 5,714,391 A | * | 2/1998 | Omura et al. .......... 438/99 |
| 5,998,635 A | | 12/1999 | Miyano et al. |
| 6,055,180 A | | 4/2000 | Gudesen et al. |

FOREIGN PATENT DOCUMENTS

| | | |
|---|---|---|
| JP | 5-144081 | 6/1993 |
| JP | 11-111466 | 4/1999 |
| JP | 11-322736 | 11/1999 |
| JP | 2000-12883 | 1/2000 |
| JP | 2002-237388 | 8/2002 |

OTHER PUBLICATIONS

Arisawa et al., "Cocise synthesis of azacycloundecenes using ring-closing metathesis (RCM)," J. Chem. Soc. Perkin Trans. 1:1873-1876 (2000).

Arisawa et al., "Stereoselectivity in ring-closing olefin metathesis (RCM) of tethered dihexenoyl derivatives," J. Chem. Soc. Perkin Trans. 1:959-964 (2002).

Arisawa et al., "Synthesis of substituted 1,2-dihydroquinolines and quinolines using ene-ene metathesis and ene-enol ether metathesis," Tetrahedron Letters 42(45):8029-8033 (2001).

Tsukamoto et al., "Scanning tunneling spectroscopy and first-principles investigation on GaAs(0 0 1)(2×6)-S surface formed by molecular beam epitaxy," Journal of Crystal/Growth 175-176 (part 2): 1303-1308 (1997) Abstract only.

* cited by examiner

*Primary Examiner*—Phuc T. Dang
(74) *Attorney, Agent, or Firm*—Peter F. Corless; Christine C. O'Day; Edwards Angell Palmer & Dodge, LLP

(57) ABSTRACT

The present invention relates to a substrate having an organic metal complex bonded on the surface thereof, which is prepared by the vapor deposition of a sulfur atom onto a substrate followed by bonding of an organic metal complex such as tetrakis-triphenylphosphine palladium [Pd(PPh$_3$)$_4$] to the surface of the substrate; a substrate bonded transition metal catalyst using said substrate; and a method for the preparation thereof. The above substrate and metal catalyst allow the solution of some problems with respect to the safety and stability of an organic metal complex in its use, the removal of trace amounts of metals in a reaction product, waste water treatment and the like.

8 Claims, No Drawings

SUBSTRATE BONDED TRANSITION METAL CATALYST AND METHOD FOR PREPARATION THEREOF

This application is a con of PCT/JP03/13031 filed Oct. 10, 2003

TECHNICAL FIELD

The present invention relates to a substrate having an organometallic complex bonded on the surface thereof, which is prepared by the vapor deposition of a sulfur atom onto a substrate followed by bonding of an organometallic complex to the surface of the substrate; a substrate bonded transition metal catalyst using said substrate; and a method for the preparation thereof.

BACKGROUND ART

The chemical reactions using an organometallic complex are now widely used in the field of medical chemistry and organic synthesis chemistry, enabling to readily construct the bonds, particularly new carbon-carbon bonds which have been difficult to be constructed by the known method. The present inventors have been involved in the development of novel reactions using organometallic complexes such as ruthenium (Ru), palladium (Pd) and a rare earth metal, i.e. ytterbium (Yb); the synthesis of bioactive compounds, and have reported the findings (see the references Nos. 6 to 8).

However, the use of organometallic complexes may cause some problems with respect to the safety, stability, removal of trace amounts of metals in a reaction product, waste water treatment, or the like. Particularly when using organometallic complexes in industrial scale, recovery of metallic catalysts used and treatment of waste water containing metals as well as removal of trace amounts of metals remained in a reaction product have been the serious problems. In consideration to the recent high social demand for the development of environmentally friendly process, recovering of metals and treatment of waste water have come to be an important issue.

In order to overcome those problems in use of organometallic complexes, the development of novel materials that can enhance efficiencies of the organometallic complexes as well as solve the problems of recovering metals and treatment of waste water is desired. One of the solutions includes depositing organometallic complexes onto the carrier surface, however, desorption of trace amounts of metals residue cannot be prevented if the deposition is made by physical adsorption. The alternative method instead of the above is highly desired.

The present inventors have been trying to develop an organometallic complex which can be chemically bonded firmly onto a carrier surface by such as covalent and coordinate bonds. The present inventors also have tried to develop a reusable novel material having a novel catalytic activity that is more stable so that desorption of metal residue is prevented by uniformly aligning biding atoms on the substrate of such as semiconductor, metal and insulator then placing the organometallic complexes to be bonded on them.

Present inventors have found that sulfur atoms formed the homogenous unit of (2×6) structure on a gallium arsenide (GaAs) substrate when the sulfur atom were deposited onto a gallium arsenide (GaAs) substrate and reacted at 400° C. under ultrahigh vacuum conditions of $1\times10^{-10}$ Torr. (See the reference No. 9).

No patent documents are found which refer to the technology utilizing the catalytic function of the substrate prepared, for example, by depositing organometallic complexes or metallic catalysts onto a gallium arsenide (GaAs) substrate. The related arts to utilize the substrate described above have been reported as follows: (1) Photo recording medium (See the reference No. 1); (2) Organic EL electrolyte (See the reference No. 2); (3) Electorically addressable passive device (See the reference No. 3); (4) Organic electroluminescence elements (See the reference No. 4); (5) Photovoltaic elements (See the reference No. 5); however, non of them are related to the organic synthesis.

The specific references relating to the present invention are as follows:

1. Japanese Unexamined Patent Publication No.H05-144081/1993
2. Japanese Unexamined Patent Publication No.H11-111466/1999
3. Japanese Unexamined Patent Publication No.2001-503183
4. Japanese Unexamined Patent Publication No.2002-237388
5. Japanese Unexamined Patent Publication No.H08-167728/1996
6. Arisawa, M., et al., J. Chem. Soc., Perkin Trans. 1, 2000, 1873
7. Arisawa, M., et al., Tetrahedron Lett., 2001, 42, 8029
8. Arisawa, M., et al., J. Chem. Soc., Perkin Trans. 1, 2002, 959
9. Tsukamoto, S., et al., J. Crystal. Growth, 1997, 175/176, 1303

DISCLOSURE OF THE INVENTION

The present invention is directed to solve the problems of organometallic complexes as described above. More particularly, the invention intends to solve the related problems resulting from the use of organometallic complexes such as safety and stability of organometallic complexes; recovering trace amounts of metals present in reaction products; treatment of waste water; or the like.

BEST MODE FOR CARRYING OUT THE INVENTION

The present inventors, as a result of diverse studies on those problems, have found that an organometallic complex can be bonded on the substrate such as a gallium arsenide (GaAs) substrate of which surface is sulfonated, also found that said organometallic complex exhibits the same or more of catalytic activity compared with a known organometallic complex, and such an organometallic complex bonded on the substrate is reusable as a catalyst.

Namely the present invention relates to a substrate having an organometallic complex bonded on the surface thereof, which is prepared by the vapor deposition of a sulfur atom onto a substrate followed by bonding of an organometallic complex comprising transition metals such as an organic phosphine complex of palladium to the surface of the substrate; and a method for the preparation thereof.

In one embodiment, the present invention relates to a substrate-bonded transition metal catalyst comprising a substrate on which the above organometallic complex is bonded.

Further, the present invention relates to method to produce organic compounds including aryl alkanes, diaryls, 1,3-dienes or the like using the above described substrate bonded transition metal catalyst of the present invention.

The present inventors conducted a reaction in the clean room such that a sulfur atom was deposited onto a gallium arsenide (GaAs) substrate and reacted at 400° C. under ultrahigh vacuum conditions of $1\times10^{-10}$ Torr. The obtained substrate was then immersed in a solution of tetrakis triphenyl phosphine palladium ($Pd(PPh_3)_4$) in benzene for 3 minutes. It was confirmed by X-ray photoelectron spectroscopy (XPS) that palladium was bonded on the gallium arsenide (GaAs) substrate. In other words, the present inventors made an organometallic complex, e.g. ($Pd(PPh_3)_4$), to be bonded onto a substrate using a sulfur atom, thereby succeeded in developing a new functional metal complex substrate. The obtained a new functional metal complex substrate was subjected to a coupling reaction of an aromatic halide with an aromatic boronic acid or a compound having double bond, and was found to exhibit the same activity as the known organometallic complexes. It is more interesting to note that the substrate of the present invention is reusable more than once whereas the known ones can be used only once and are thrown away.

Heck reaction (H. A. Dieck and R. F. Heck, J. Am. Chem. Soc., 96, 1133 (1974): R. F. Heck, Acc. Chem. Rev., 12, 146 (1979)), for example, is the condensation reaction of arylhalides or alkenylhalides with alkenes i.e. benzene halide, for example, is reacted with acrylic ester to prepare cinnamic ester. Iodobenzene was reacted with methylacrylate using the organometallic complex substrate of the present invention in the presence of triethylamine and gave the intended cinnamic methyl ester in 35% yield. The $2^{nd}$ run of the reaction was conducted using said substrate and gave the intended cinnamic methyl ester in 13% yield; then yield of 9% was obtained in $3^{rd}$ run, proving that the substrate of the present invention is reusable although detected the reduction in yield.

Suzuki-Miyaura coupling (N. Miyaura, et al., Synth. Commun., 11, 513 (1981): N. Miyaura, and A. Suzuki, Chem. Rev., 95, 2457 (1995): A. Suzuki, J. Organomet. Chem., 576, 147 (1999) is a condensation reaction of an aryl or vinyl boron derivatives with halides or sulfonates having carbon-carbon double bonds i.e. the reaction of preparing biphenyl derivatives by condensing a benzene halide with phenylboron. Iodobenzene was reacted with 3-chlorophenylborate using the organometallic complex substrate of the present invention in the presence of triethylamine, thereby obtained the intended 3-chlorobiphenyl in 23% yield. The $2^{nd}$ run of the reaction was conducted using said substrate and gave the intended 3-chlorobiphenyl in 20% yield; then yield of 6% was obtained in $3^{rd}$ run, proving that the substrate of the present invention is reusable although detected the reduction in yield.

In both reactions, the organometallic complex substrate of the present invention was found to be hundreds of times as active as powdered organometallic complex used alone in the known method.

As a control experiment, a gallium arsenide (GaAs) substrate and S-terminated (sulphur-terminated) gallium arsenide (GaAs) substrate (neither of them are not vapor deposited with palladium) were subjected to the same reaction, however, no advancements have been detected in either Heck reaction or Suzuki-Miyaura coupling.

XPS (X-ray photoelectron spectroscopy) measurements were performed with respect to the substrate afier termination of the reactions. As a result, photoemmision and Auger signals from Ga, As, C and O were clearly observed. In addition, 3d core-level photoemission was detected with the proper spin-orbit splitting energy of 5.3 eV. However, no information was obtained regarding the chemical state of palladium due to static charge.

Further investigation was carried out with respect to detection of the signals from carbon (C). After $Ar^+$-ion was sputtered (1.5 keV) onto the substrate for 3 minutes, signals from C was disappeared while those from Ga, As, O and Pd were increased. This result suggests that the surface of the substrate after the reaction was covered with organic materials from the reaction mixture. The signals of Ga and As core-level photoemissions showed large contribution from As—O and Ga—O bonds. This result is reasonable because oxidation of the substrate is inevitable due to exposure to air before and after the reactions. Although the effect of oxygen (O) on the reactions is not apparent, the preliminary experiments of the present inventors show a negative correlation between the amount of oxygen and the yield of the reactions.

The signals of sulfur (S) core level photoemissions were not detected even in the gallium arsenide (GaAs) substrate, the surface thereof was vapor deposited with sulfur in clean atmosphere. In consequence of the above, it is impossible to conclude that the absence of the sulfur relating signals means desorption of the terminal sulfur.

Pd- and P-related signals on the surface of the substrate were present before the reaction. On the other hand, the P-related signal on the surface of the substrate was not detected after the reaction. It suggests that triphenyphosphine on Pd, being a ligand, may be desorbed when substituted by organic molecules during above reactions. It is important that the Pd of the metal is not desorbed from but stays on the surface of the substrate, although the ligand of Pd may be desorbed during the chemical reaction.

As described above, the present invention is related to the findings that an organometallic complex substrate whereupon the organometallic complex is bonded can be obtained by vapor deposition of a sulfur atom onto a substrate such as a gallium arsenide substrate; and proved that the obtained substrate exhibits the same or more catalytic activities compared with the original organometallic complexes and can be reusable without causing desorption of metals from said substrate.

As a substrate of the present invention, the substrate whereupon a sulfur atom is vapor depositable can be used, including a semiconductor substrate such as GaAs, a metal substrate such as gold and a resin substrate such as synthetic resin.

A preferable organometallic complex of the present invention is a metal complex having catalytic activity comprising organic materials such as phosphine as a ligand. The organometallic complexes of the present invention are not particularly limited to comprise metal-carbon bonds, but preferably comprise the organic material as a ligand and exhibit catalytic activity. The preferable metal atoms are transition metals, particularly including ruthenium (Ru), palladium (Pd) and a rare earth metal, ytterbium (Yb); more preferably including those having high affinity for sulfur. The preferable organometallic complexes include the above described phosphine complex of palladium such as tetrakistriphenylphosphine palladium [$Pd(PPh_3)_4$].

The reaction with regard to the catalyst of the present invention, is not particularly limited, but can be any as far as it exhibits catalytic activities of the organometallic complexes of the present invention. It is not limited to the reaction that generates the carbon-carbon bonds described above but includes various reactions such as hydrogen reduction reactions, asymmetric synthesis reactions and substitution reactions.

The inventors of the present invention, for the first time in the world, succeeded in the development of the substrate bonded transition metal catalyst wherein the organometallic complexes are bonded to the substrate through sulfur atoms. The substrate bonded transition metal catalyst of the present invention, not causing desorption of metal atoms during the reaction and being reusable repeatedly, made it possible to solve the existing problems with respect to the safety and stability in use of organometallic complexes as catalysts, removal of trace amounts of metals still remained in the reaction products, treatment of the waste water, or the like.

The substrate bonded transition metal catalyst of the present invention can be treated in the same way as the ordinary substrate and can also be formed into various shapes suitable for practical use such as board, tube and reaction vessel.

Further, the present invention is to provide a method to produce aryl alkenes and 1,3-dienes by the condensation of arylhalide or alkenylhalide with alkenes using the substrate bonded transition metal catalyst of the present invention which comprises tetrakis-triphenylphosphine palladium [Pd(PPh$_3$)$_4$] as organometallic complexes. For example, it is to provide a method for producing cinnamic esters by the reaction of benzene halides with acrylic esters.

Halogen atoms of arylhalides or alkenylhalides in the producing method of the present invention include chlorine, bromine or iodine. Aryl groups of arylhalides include aromatic groups such as substituted or unsubstituted phenyl groups, naphthyl groups, pyridyl groups and furyl groups. The substituents thereof are not limited unless adversely affect the reactions but includes, for example, substituted or unsubstituted alkyl groups having 1 to 20, preferably having 1 to 10 carbon atoms; substituted or unsubstituted alkoxy groups having 1 to 20, preferably having 1 to 10 carbon atoms; substituted or unsubstituted alkoxy carbonyl groups having 1 to 20, preferably having 1 to 10 carbon atoms; or the like. Alkenyl groups of alkenylhalides include substituted or unsubstituted vinyl groups. The substituents thereof include substituted or unsubstituted alkyl groups having 1 to 20, preferably having 1 to 10 carbon atoms; substituted or unsubstituted alkenyl groups having 1 to 20, preferably having 1 to 10 carbon atoms; substituted or unsubstituted aryl groups having 6 to 20, preferably having 6 to 10 carbon atoms; substituted or unsubstituted aralkyl group having 7 to 20, preferably having 7 to 12 carbon atoms. The substituents thereof are not particulary limited unless adversely affect the reactions.

Alkenes in the producing method of the present invention include ethylene derivatives which contain at least one hydrogen atom. The preferable alkenes include substituted or unsubstituted acrylic esters. The ester residues of said acrylic esters include substituted or unsubstituted alkyl group, having 1 to 20, preferably having 1 to 10 carbon atoms. The substituents thereof are not particulary limited unless adversely affect the reactions.

The producing method of the present invention preferably includes halogenated hydrogen trapping agents in the reaction system as halogenated hydrogen is generated during the reaction. The halogenated hydrogen trapping agents preferably include tertiary amines such as triethylamine and N,N-diethylaminobenzene.

The producing method of the present invention is preferably carried out in an inert solvent such as acetonitrile and tetrahydrofuran. The reaction temperature can be selected within a range from the room temperature to the boiling point of the solvent.

The catalysts of the present invention, as being solid, are removed after the reaction. The intended product can be separated according to the conventional method such as concentration and extraction and then purified and isolated by the various purification methods.

Further, the present invention is to provide a method to produce diaryl derivatives, alkenyl derivatives or 1,3-dienes by the condensation of aryl boronic acid derivatives or vinylboronic acid derivatives with halides having carbon-carbon double bonds or sulfonates having carbon-carbon double bonds using the substrate bonded transition metal catalyst of the present invention which comprises tetrakis-triphenylphosphine palladium [Pd(PPh$_3$)$_4$]. For example it provides the method to produce biphenyl derivatives by condensation of halogenated benzene with phenylboronic acid.

Aryl boronic acid derivatives or vinylboronic acid derivatives in the producing method of the present invention are not limited but include, for example, mono-, di- or tri-orthoborate esters or the derivatives thereof. Aryl groups of the aryl boronic acid derivatives include aromatic groups such as substituted or unsubstituted phenyl groups, naphthyl groups, pyridyl groups and furyl groups. The substituents thereof are not limited unless adversely affect the reactions but include, for example, halogen atoms such as chlorine, bromine and iodine; substituted or unsubstituted alkyl group having 1 to 20, preferably having 1 to 10 carbon atoms; substituted or unsubstituted alkoxy group having 1 to 20, preferably having 1 to 10 carbon atoms. Vinyl groups of vinylboronic acid derivatives include substituted or unsubstituted vinyl groups. The substituents thereof are not particulary limited unless adversely affect the reactions.

Halogen atoms of halides having carbon-carbon double bonds in the producing method of the present invention include chlorine, bromine, iodine or the like. Sulfonates of sulfonates having carbon-carbon double bonds are sulfonic acid or the derivative thereof including various metal salts such as sodium sulfonates and potassium sulfonates; and ammonium salts. The groups having carbon-carbon double bonds in halides having carbon-carbon double bonds or sulfonates having carbon-carbon double bonds can be any groups having aliphatic carbon-carbon double bonds or aromatic carbon-carbon double bonds including, for example, substituted or unsubstituted vinyl groups; substituted or unsubstituted aryl groups, wherein aryl groups include the above described carboncyclic aromatic groups or aromatic heterocyclic groups. The substituents thereof are not particularly limited unless adversely affect the reactions.

The producing method of the present invention preferably includes halogenated hydrogen trapping agents present in the reaction system as halogenated hydrogen may be generated during the reaction. The halogenated hydrogen trapping agents preferably include tertiary amines such as triethylamine and N,N-diethylaminobenzene.

The producing method of the present invention is preferably carried out in an inert solvent such as dimethylformamide and dimethylsulfoxide. The reaction temperature can be selected within a range from the room temperature to the boiling point of the solvent.

The catalysts of the present invention, as being solid, are removed after the reaction. And the subject product can be separated according to the conventional method such as concentration and extraction, and then purified and isolated by the various purification methods.

Japanese unexamined patent application No.2002-299141 is incorporated herein by reference.

EXAMPLES

Hereinafter, the present invention will be described in more detail by the Examples. However, the present invention should not be construed as being limited thereto.

Example 1

Preparation of S-terminated GaAs Substrate

GaAS(001) substrate with the size of 13×11 mm$^2$ was prepared by standard cleaning and etching procedures, and then loaded into an MBE (molecular beam epitaxy) chamber. A GaAs buffer layer about 1 μm thick was grown at 550° C., resulting in smooth one-monolayer-stepped terraces. The obtained substrate was then processed by the multi-step S termination method (S. Tsukamoto, et al., Cryst. Growth, 175/176, 1303 (1997)). The process is as follows. First, the substrate temperature is adjusted to 200° C. At this temperature, an arsenic-rich c(4×4) layers covers the entire surface. Next, the substrate was transferred into the MBE sample introduction chamber and exposed to S vapor. The pressure was kept at 6×10−4 Pa for 15 min. The substrate was then transferred back into the MBE growth chamber and annealed at 400° C. for 30 min without As molecular-beam flux. Due to the difference in the bond energies of S—Ga and As—Ga, only the as atoms remaining on the Ga layer were desorbed. By repeating the same process, a highly uniform (2×6) surface reconstruction was realized.

Example 2

Preparation of Substrate Bonded Transition Metal Catalysts

The substrate was then transferred from the MBE system into air. Immediately thereafter it was placed in a solution of Pd(PPh$_3$)$_4$ (25 mg) in benzene (20 ml) for 3 min, and then dried under ambient atmosphere. The weight of the substrate increased about 0.6 mg. The substrate was then cleaved into four pieces by the conventional method. Thus, at least 0.15 mg of Pd(PPh$_3$)$_4$ was on the substrate surfaces.

Example 3

Heck Reaction

To a solution of iodobenzene (102 mg), methylacrylate (1.25 eq.) and triethylamine (1.25 eq.) in acetonitrile (3.00 ml) was added the catalyst substrate (5×5) obtained in Example 2. The mixture was stirred at 100° C. for 12 h under an argon atmosphere. The organic layers were then washed with brine and dried over sodium sulfate. The solvents were removed under reduced pressure and the resulting residue was purified by silica gel column chromatography (n-hexane:ethyl acetate=5:1). The intended product, trans-methyl cinnamate was obtained with yield of 35%. The recycled substrate was subjected to the above reaction conditions in a 2$^{nd}$ run and the intended product methyl cinnamate was obtained with yield of 13%. Further conducted the 3$^{rd}$ run and the intended methyl cinnamate was obtained with yield of 9%.

Example 4

Suzuki-Miyaura Coupling

To a solution of iodobenzene (102 mg) in dimethylformamide (3 ml), triethylamine (3.00 eq.), 3-chlorophenylborate (1.5 eq.) and the catalyst substrate (5×5) obtained in Example 2 was added, and the mixture was stirred at 100° C. for 12 h under an argon atmosphere. To the reaction was added water after the termination of the reaction, and extracted with dichloromethane. The organic layers were then washed with brine, dried over sodium sulfate. The solvents were removed under reduced pressure and the resulting residue was purified by silica gel column chromatography (n-hexane) and gave the intended product, 3-chlorobiphenyl, in 23% yield.

The recycled substrate was subjected to the above reaction conditions in a 2$^{nd}$ run and the intended product, 3-chlorobiphenyl, was obtained in 20% yield. Further conducted the 3$^{rd}$ run and the intended product, 3-chlorobiphenyl, was obtained with yield of 6%.

INDUSTRIAL APPLICABILITY

In conclusion, the present inventors have succeeded, for the first time in the world, in developing the substrate bonded transition metal catalyst wherein GaAs substrate and tetrakis-triphenylphosphine palladium [Pd(PPh$_3$)$_4$] are bonded through a sulfur atom. The organometallic complex having such a catalytic activity can be immobilized on the substrate. The invention further revealed that a metal atom does not desorbed from said substrate after the organic synthetic reaction using said catalyst, proving that the metal substrate of the present invention is reusable and has a catalytic activity.

By using the substrate bonded transition metal catalyst of the present invention, the problems such as safety, stability, the removal of trace amounts of metals included in the reaction products and treatment of waste water resulting from the use of organometallic catalysts have come to be solved.

The invention claimed is:

1. A substrate having an organometallic complex bonded on the surface thereof, which is prepared by steps comprising vapor deposition of a sulfur atom onto a substrate followed by bonding of an organometallic complex on the surface of said substrate, and wherein the substrate is a gallium arsenide (GaAs) substrate.

2. The substrate according to claim 1, wherein the metal atoms of the organometallic complex are transition metals.

3. The substrate according to claim 2, wherein the transition metals comprise palladium.

4. The substrate according to claim 1, wherein the organometallic complex is an organic phosphine complex of palladium.

5. A substrate bonded transition metal catalyst comprising the substrate according to claim 1.

6. The substrate bonded transition metal catalyst according to claim 5, wherein the catalyst is for use of synthetic reaction or organic compounds.

7. A method of producing the substrate having an organometallic complex bonded to the surface thereof according to claim 1, which is prepared by the vapor deposition of a sulfur atom onto a substrate followed by bonding of an organometallic complex on the surface of said substrate, and wherein the substrate is a gallium arsenide (GaAs) substrate.

8. A method of producing a substrate having an organometallic complex bonded to the surface thereof, the method comprising:

vapor depositing one or more sulfur atoms onto a substrate, and bonding an organometallic complex on the substrate; and wherein the substrate is a gallium arsenide (GaAs) substrate.

* * * * *